(12) United States Patent
Senda et al.

(10) Patent No.: US 7,718,308 B2
(45) Date of Patent: May 18, 2010

(54) TEMPERATURE FUSE AND BATTERY USING THE SAME

(75) Inventors: Kenji Senda, Fukui (JP); Atsushi Kono, Osaka (JP); Tatsuya Wada, Miyazaki (JP)

(73) Assignee: Panasonic Corporation, Osaka (JP)

( * ) Notice: Subject to any disclaimer, the term of this patent is extended or adjusted under 35 U.S.C. 154(b) by 756 days.

(21) Appl. No.: 11/709,051

(22) Filed: Feb. 22, 2007

(65) Prior Publication Data

US 2007/0212600 A1 Sep. 13, 2007

Related U.S. Application Data

(62) Division of application No. 10/479,577, filed on Dec. 4, 2003, now Pat. No. 7,473,487.

(30) Foreign Application Priority Data

Jun. 5, 2001 (JP) .............................. 2001-169238

(51) Int. Cl.
*H01M 10/50* (2006.01)
*H01M 37/76* (2006.01)

(52) U.S. Cl. ........................... 429/62; 429/61; 337/298; 337/401; 337/413; 337/414; 337/399

(58) Field of Classification Search ....................... None
See application file for complete search history.

(56) References Cited

U.S. PATENT DOCUMENTS 3,522,571 A * 8/1970 Axford et al. ............... 337/203
6,040,754 A * 3/2000 Kawanishi ................... 337/297
6,653,925 B1 * 11/2003 Asami et al. ................ 337/401

FOREIGN PATENT DOCUMENTS

| JP | 2-15239 | 4/1990 |
|---|---|---|
| JP | 2-195624 | 8/1990 |
| JP | 3-43927 | 2/1991 |
| JP | 4-63530 | 5/1992 |
| JP | 8-50842 | 2/1996 |
| JP | 11-126553 | 5/1999 |
| JP | 11-353995 | 12/1999 |
| JP | 11-353996 | 12/1999 |
| JP | 2000-36237 | 2/2000 |
| JP | 2001-43846 | 2/2001 |
| JP | 2001-243861 | 9/2001 |

* cited by examiner

*Primary Examiner*—Patrick Ryan
*Assistant Examiner*—Cynthia Lee
(74) *Attorney, Agent, or Firm*—Wenderoth, Lind & Ponack, L.L.P.

(57) ABSTRACT

A thermal fuse includes an insulating case having a bottom and having an opening provided therein, a fusible alloy provided in the insulating case, a lead conductor having one end connected to the fusible alloy and other end led out from the insulating case through the opening of the insulating case, a flux provided on the fusible alloy, and a sealer for sealing the opening of the insulating case. The volume of a space between the fusible alloy in the insulating case and the sealer is larger than the volume of the flux. Sealing of the fuse is prevented from deteriorating, and the insulating film is prevented from damage even when the thermal fuse is used for breaking a large current at a high voltage.

7 Claims, 16 Drawing Sheets

TEMPERATURE FUSE AND BATTERY USING THE SAME

This application is a divisional application of application Ser. No. 10/479,577 filed on Dec. 4, 2003 now U.S. Pat. No. 7,473,487, which is a U.S. National Stage (§371) of International Application PCT/JP02/05534, filed Jun. 5, 2002

TECHNICAL FIELD

The present invention relates to a thermal fuse and a battery including the fuse.

BACKGROUND ART

FIG. 32 is a sectional view of a conventional thermal fuse. The conventional thermal fuse shown in FIG. 32 includes fusible alloy 2 including tin and a pair of lead conductors 3 connected to respective ends of the alloy 2. The connectors may be connected by welding or supersonic welding, or by melting the fusible alloy 2 with an electrical power applied to the lead conductors 3 and the fusible alloy 2. The fusible alloy 2 is coated with flux 14, and accommodated in insulating case 1 having an opening. The opening of the insulating case 4 is sealed with sealer 5 made of hard resin.

In the conventional thermal fuse, the flux 3 melts according to an increase of an ambient temperature, thus removing an oxide from a surface of the fusible alloy 2. Then, when the ambient temperature further increases and exceeds the melting point of the fusible alloy 2, the fusible alloy 2 melts to break electricity. For reliably achieving the fusing, the flux 4 is applied to a wide portion of the entire surface of the fusible alloy 2. When the thermal fuse melts, arc is generated between respective tips of melting fusible alloy 2. In particular, a high voltage or a large current is applied at breaking increases energy of the arc. The arc energy vaporizes or decomposes the flux 4 provided on the fusible alloy 2. This rapidly increases the number of molecules in the insulating case 1 sealed with the sealer 5, thus increasing a pressure in a space in the thermal fuse. If the energy of the arc is large, the energy may cause the sealing to deteriorate or damages the insulating case 1 of the thermal fuse. Therefore, the conventional thermal fuse cannot be used as a thermal fuse for breaking a high voltage or a large current.

SUMMARY OF THE INVENTION

A thermal fuse includes an insulating case having a bottom and having an opening provided therein, a fusible alloy provided in the insulating case, a lead conductor having one end connected to the fusible alloy and another end led out of the insulating case through the opening of the insulating case, a flux provided on the fusible alloy, and a sealer for sealing the opening of the insulating case. The volume of a space in the insulating case between the fusible alloy and the sealer is larger than the volume of the flux.

The thermal fuse has the volume of the space in the insulating case between the fusible alloy and the sealer is larger than the volume of the flux provided on the fusible alloy. Therefore, when the flux melts according to an increase of an ambient temperature, most of the flux moves into the space in the insulating case between the fusible alloy and the sealer. The amount of the flux existing on the fusible alloy is accordingly very little. Therefore, even when arc is generated between tips of the melting fusible alloy according to a further increase of the ambient temperature to exceed the melting point of the fusible alloy, the amount of flux vaporized due to the arc can be reduced. This suppresses a pressure rise of the space in the thermal fuse, thus preventing the sealing from deteriorating and preventing the insulating case in the thermal fuse from a damage even when the fuse is used at a high voltage or a large current.

DETAILED DESCRIPTION OF THE PREFERRED EMBODIMENTS

Exemplary Embodiment 1

Figure 1:
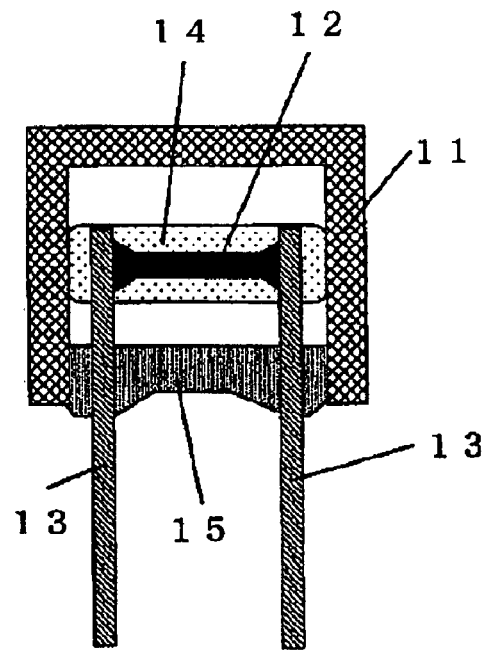
FIG. 1 is a sectional view of a radial-type thermal fuse according to Exemplary Embodiment 1 of the present invention.
Figure 2:
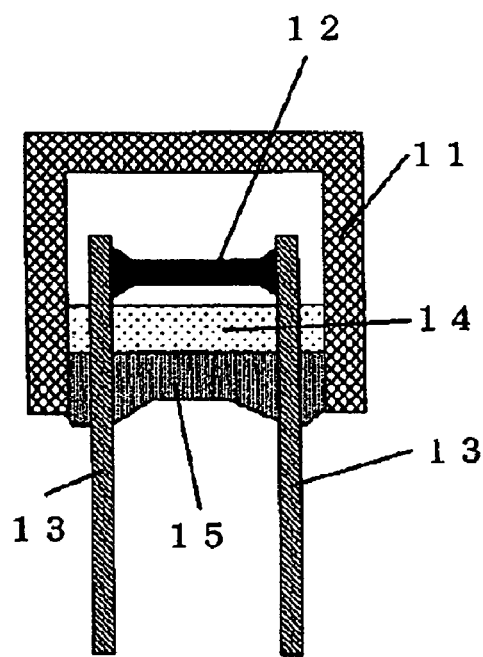
FIG. 2 is a sectional view of the thermal fuse having melting flux according to Embodiment 1.

FIG. 1 is a sectional view of a radial-type thermal fuse according to Exemplary Embodiment 1 of the present invention. FIG. 2 is a sectional view of the thermal fuse having melting flux. A cylindrical or rectangular insulating case 11 having a bottom and having an opening provided therein is made of one of polybutylene telephthalate (PBT), polyphenylene sulfide (PPS), polyethylene telephthalate (PET), phenol resin, ceramic, and glass. Fusible alloy 12 having substantially a cylindrical or rectangular shape is provided in the insulating case 11. The fusible alloy 12 is made of one of tin, lead, zinc, bismuth, indium, cadmium, silver, copper, and alloy of these metals. Respective ends of a pair of lead conductors 13 are connected to respective ends of the fusible alloy 12. Respective other ends of the lead conductors 13 are led out of the insulating case 11 through the opening of the insulating case 11. The lead conductors 13 having a wire shape may be made of single metal, such as copper, iron, nickel, or alloy of these metals, and have their surfaces plated with one of tin, lead, zinc, bismuth, indium, cadmium, silver, copper, and alloy of these metals. The fusible alloy 12 is coated with flux 14. The flux 14 melts according to an increase of an ambient temperature, then removing a oxide film on the fusible alloy 12. The flux 14 includes not less than 20 wt. % of amide stearate, and preferably 30 wt. %. Since the flux 14 which melts has a small viscosity due to amide stearate, the flux 14 reliably moves when melting according to an increase of the ambient temperature. The opening of the insulating case 11 is sealed with sealer 15 made of hard resin, such as epoxy or silicon. The fusible alloy 12 and the lead conductors 13 are connected by welding or supersonic welding, or by melting the fusible alloy 12 with an electrical power supplied to the lead conductors 13 and the fusible alloy 12.

According to Embodiment 1, as shown in FIG. 1, the volume of a space in the insulating case 11 between the fusible alloy 12 and the sealer 15 is larger than the volume of the flux 14.

Upon being used on an electronic device or a heating component, such as a transformer or a motor, as shown in FIG. 2, the radial-type thermal fuse of Embodiment 1 is attached to the electronic device or the heating component, so that the space between the fusible alloy 12 and the sealer 15 is positioned substantially in the same direction as the gravity from the fusible alloy 12. The volume of a space in the insulating case 11 between the fusible alloy 12 and the sealer 15 is larger than the volume of the flux 14. Therefore, when the flux 14 in use melts according to the increase of the ambient temperature, most of the flux 14 melts and then reliably moves into the space in the insulating case 11 between the fusible alloy 12 and the sealer 15 due to the gravity. As a result, little amount of the flux 14 existing on the fusible alloy 12. Even when arc is generated between respective tips of fusible alloy 12 melting according to a further increase of the ambient temperature to exceed the melting point of the fusible alloy 12, vaporization of the flux 14 due to the arc is reduced. Accordingly, since a pressure rise in the space in the thermal fuse of Embodiment 1 is suppressed, the sealer is prevented from deteriorating and the insulating case 11 is prevented from damage even when the fuse is used for breaking a large current at a high voltage. The flux 14 includes not less than 20 wt. % of amide stearate, preferably 30 wt. %, and thus, the flux 14 which melts has a small viscosity and moves smoothly.

Exemplary Embodiment 2

Figure 3:
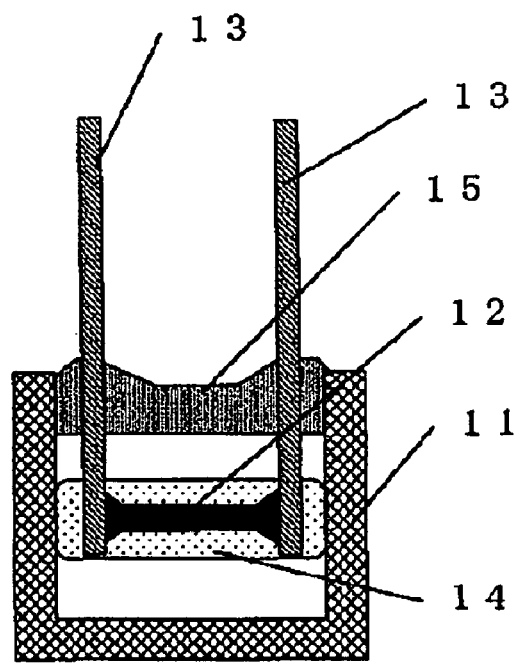
FIG. 3 is a sectional view of a radial-type thermal fuse according to Exemplary Embodiment 2 of the invention.
Figure 4:
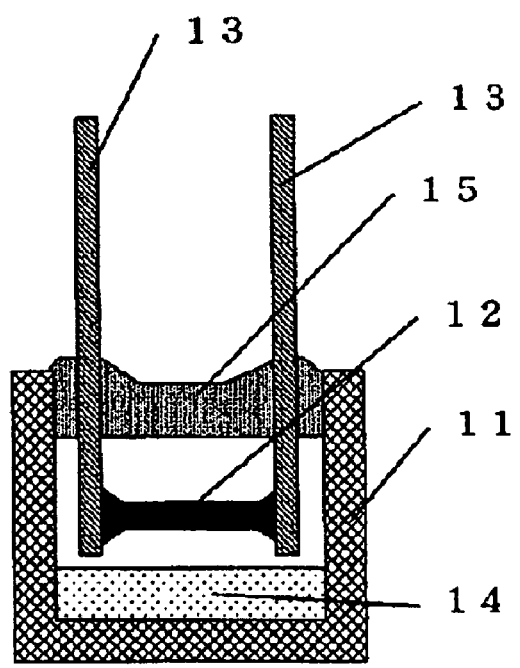
FIG. 4 is a sectional view of the thermal fuse having melting flux according to Embodiment 2.

FIG. 3 is a sectional view of a radial-type thermal fuse according to exemplary Embodiment 2 of the present invention. FIG. 4 is a sectional view of the thermal fuse having melting flux. The thermal fuse of Embodiment 2 includes the same components as those of a thermal fuse of Embodiment 1 shown in FIGS. 1 and 2. The fuse of embodiment 2, differently from that of Embodiment 1, the volume of a space in an insulating case 11 between a fusible alloy 12 and a bottom of an insulating case 11 is larger than the volume of flux 14, as shown in FIG. 3.

Upon being used on an electronic device or a heating component, such as a transformer or a motor, as shown in FIG. 4, the radial-type thermal fuse of Embodiment 2 is attached to the electronic device or the heating component, so that the space between the fusible alloy 12 and the bottom of the insulating case 11 is positioned substantially in the same direction as the gravity from the fusible alloy 12. According to Embodiment 2, the volume of a space in the insulating case 11 between the fusible alloy 12 and the inner bottom of the insulating case 11 is larger than the volume of the flux 14. Therefore, when the flux 14 in use melts according to an increase of an ambient temperature, most of the flux 14 melts and then reliably moves into the space in the insulating case 11 between the fusible alloy 12 and the bottom of the insulating case 11 due to the gravity. As a result, little amount of the flux 14 existing on the fusible alloy 12. Even when arc is generated between respective tips of melting fusible alloy 12 according to a further increase of the ambient temperature to exceed the melting point of the fusible alloy 12, vaporization of the flux 14 caused by the arc is reduced. Accordingly, the thermal fuse of Embodiment 2 has a pressure rise in the space in the thermal fuse can be suppressed, the sealer is prevented from deteriorating and the insulating case 11 is prevented from damage even when the fuse is used for breaking a large current at a high voltage.

Exemplary Embodiment 3

Figure 5:
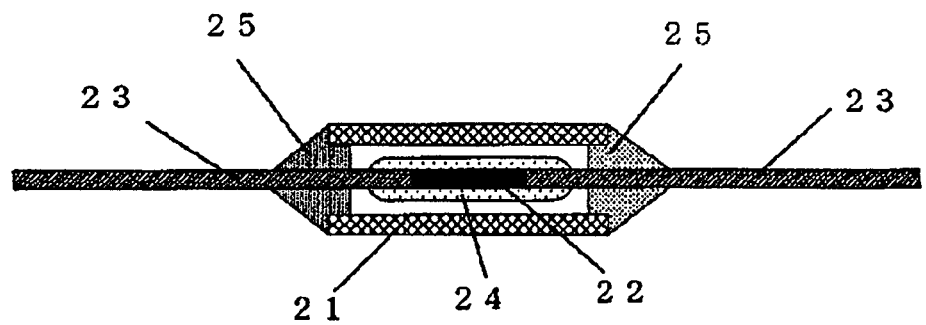
FIG. 5 is a sectional view of an axial-type thermal fuse according to Exemplary Embodiment 3 of the invention.
Figure 6:
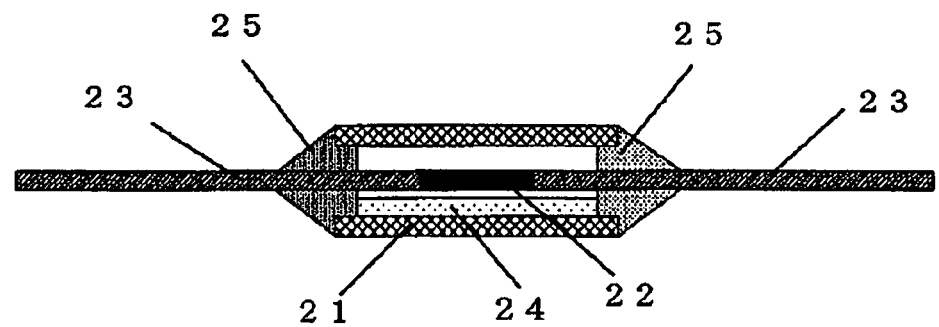
FIG. 6 is a sectional view of the thermal fuse having melting flux according to Embodiment 3.

FIG. 5 is a sectional view of an axial-type thermal fuse according to Exemplary Embodiment 3 of the present invention. FIG. 6 is a sectional view of the thermal fuse having melting flux. An insulating case 21 having a cylindrical or rectangular shape and having openings provided therein is made of one of polybutylene telephthalate (PBT), polyphenylene sulfide (PPS), polyethylene telephthalate (PET), phenol resin, ceramic, and glass. Fusible alloy 22 having substantially a cylindrical or rectangular shape is provided in the insulating case 21. The fusible alloy 22 is made of one of tin, lead, zinc, bismuth, indium, cadmium, silver, copper, and alloy of these metals. Respective one ends of a pair of lead conductors 23 are connected to respective ends of the fusible alloy 22. Respective other ends of the lead conductors 23 are led out of the insulating case 21 through the opening of the insulating case 21. The lead conductors 23 having a wire shape is made of single metal, such as copper, iron, nickel, and alloy of these metals, and has their surfaces plated with one of tin, lead, zinc, bismuth, indium, cadmium, silver, and copper, and alloy of these metals. The fusible alloy 22 is coated with flux 24, and the flux 24 melts according to an increase of an ambient temperature, then removing an oxide film on the fusible alloy 22. The openings at both sides of the insulating case 21 are sealed with sealers 25 made of hard resin, such as epoxy or silicon. The fusible alloy 22 and the lead conductors 23 are connected by welding or supersonic welding, or by melting the fusible alloy 22 with an electrical power applied to the lead conductors 23 and the fusible alloy 22.

According to Embodiment 3, the volume of a space in the insulating case 21 under the fusible alloy 22 and over an lower inner surface of the insulating case 21 is larger than the volume of the flux 24, as shown in FIG. 5

Upon being used on an electronic device or a heating component, such as a transformer or a motor, as shown in FIG. 6, the radial thermal fuse of Embodiment 3 is attached to the electronic device or the heating component, so that the space under the fusible alloy 22 and over the lower inner surface of the insulating case 21 is positioned substantially in the same direction as the gravity from the fusible alloy 22. According to Embodiment 2, the volume of the space in the insulating case 21 under the fusible alloy 22 and over the lower inner surface of insulating case 21 is larger than the volume of the flux 24. Therefore, when the flux 24 melts according to an increase of an ambient temperature, most of the flux 24 melts and reliably moves into the space in the insulating case 21 under the fusible alloy 22 and over the lower inner surface of the insulating case 21 due to the gravity. As a result, little amount of the flux 14 existing on the fusible alloy 22. Even when arc is generated between respective tips of fusible alloy 22 melting according to a further increase of the ambient temperature to exceed the melting point of the fusible alloy 22, vaporization of the flux 24 caused by the arc is reduced. Accordingly, in the thermal fuse of Embodiment 3, since a pressure rise of the space in the thermal fuse can be suppressed, the sealers are prevented from deteriorating, and the insulating case 21 is prevented from damage even when the fuse is used for breaking a large current at a high voltage.

Exemplary Embodiment 4

Figure 7:
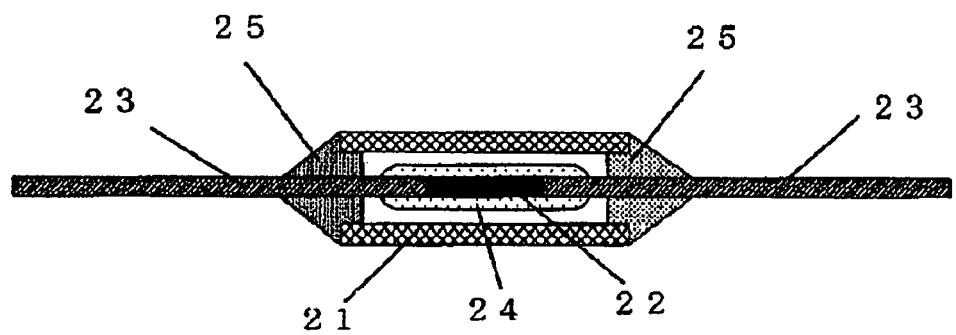
FIG. 7 is a sectional view of an axial-type thermal fuse according to Exemplary Embodiment 4 of the invention.
Figure 8:
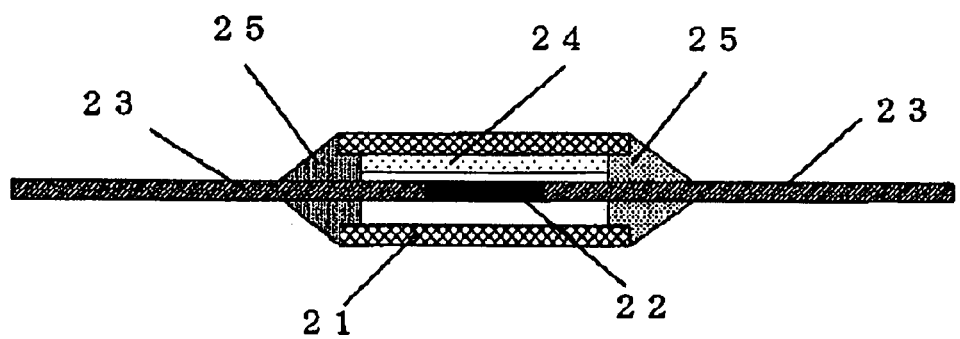
FIG. 8 is a sectional view of the thermal fuse having melting flux according to Embodiment 4.

FIG. 7 is a sectional view of an axial-type thermal fuse according to Exemplary Embodiment 4 of the present invention. FIG. 8 is a sectional view of the thermal fuse having melting flux. The thermal fuse of Embodiment 4 includes the same components as those of an axial-type thermal fuse of Embodiment 3 shown in FIGS. 5 and 6. The fuse of Embodiment 4, differently from that of Embodiment 3, as shown in FIG. 7, the volume of a space in the insulating case 21 over fusible alloy 22 and under the upper inner surface of insulating case 21 is larger than the volume of flux 24.

Upon being used on an electronic device or a heating component, such as a transformer or a motor, as shown in FIG. 8, the thermal fuse of Embodiment 4 is attached to the electronic device or the heating component, so that the space over the top side of fusible alloy 22 and under the upper inner surface of the insulating case 21 is positioned substantially in the same direction as the gravity from the fusible alloy 22. According to Embodiment 4, the volume of the space in the insulating case 21 over the top side of fusible alloy 22 and under the upper inner surface of the insulating case 21 is larger than the volume of the flux 24. Therefore, when the flux 24 melts according to an increase of an ambient temperature, most of the flux 24 melts and reliably moves into the space in the insulating case 21 over the top side of fusible alloy 22 and under the upper inner surface of the insulating case 21 due to the gravity. As a result, little amount of the flux 24 existing on the fusible alloy 22. Even when arc is generated between tips of fusible alloy 22 melts according to an further increase of the ambient temperature to exceed the melting point of the fusible alloy 22, vaporization of the flux 24 caused by the arc is reduced. Accordingly, in the thermal fuse of Embodiment 4, since a pressure rise in the space in the thermal fuse can be suppressed, the sealers are prevented from deteriorating, and the insulating case 21 is prevented from damage even when the fuse is used for breaking a large current at a high voltage.

Exemplary Embodiment 5

Figure 9:
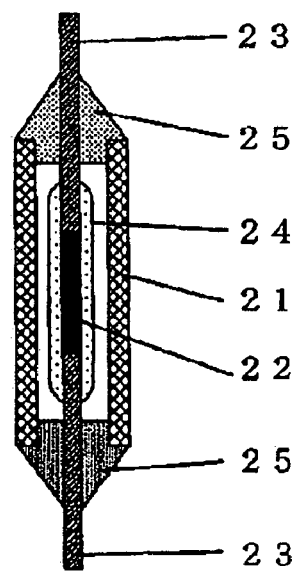
FIG. 9 is a sectional view of an axial-type thermal fuse according to Exemplary Embodiment 5 of the invention.
Figure 10:
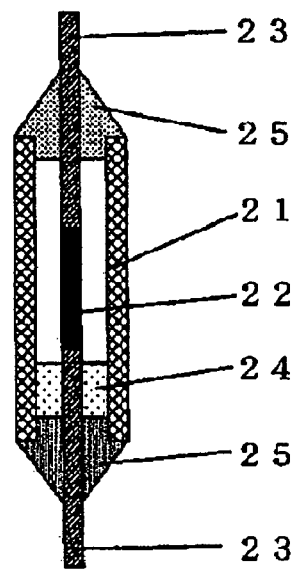
FIG. 10 is a sectional view of the thermal fuse having melting flux according to Embodiment 5.

FIG. 9 is a sectional view of an axial-type thermal fuse according to Exemplary Embodiment 5 of the present invention. FIG. 10 is a sectional view of the thermal fuse having melting flux. The thermal fuse of Embodiment 5 includes the same components as those of a thermal fuse of Embodiment 3 shown in FIGS. 5 and 6. The fuse of Embodiment 5, differently from that of Embodiment 3, as shown in FIG. 9, the volume of a space in the insulating case 21 between one end of the fusible alloy 22 and one of sealers 25 is larger than the volume of flux 24.

Upon being used on an electronic device or a heating component, such as a transformer or a motor, as shown in FIG. 10, the thermal fuse of Embodiment 5 is attached to the electronic device or the heating component, so that the space between one end of the fusible alloy 22 and one the sealers 25 is positioned substantially in the same direction as the gravity from the fusible alloy 22. According to Embodiment 5, the volume of the space in the insulating case 21 between one end of the fusible alloy 22 and the sealer 25 is larger than the volume of the flux 24. Therefore, when the flux 24 melts according to an increase of an ambient temperature, most of the flux 24 melts and reliably moves into the space in the insulating case 21 between the one end of the fusible alloy 22 and the sealer 25 due to the gravity. As a result, little amount of the flux 24 existing on the fusible alloy 22. Even when arc is generated between tips of fusible alloy 22 melting according a further increase of the ambient temperature to exceeding the melting point of fusible alloy 22, vaporization of the flux 24 caused by the arc is reduced. Accordingly, in the thermal fuse of Embodiment 5, since a pressure rise in the space in the thermal fuse can be suppressed, the sealers are prevented from deteriorating, and the insulating case 21 is prevented from damage even when the fuse is used for breaking a large current at a high voltage.

Exemplary Embodiment 6

Figure 11:
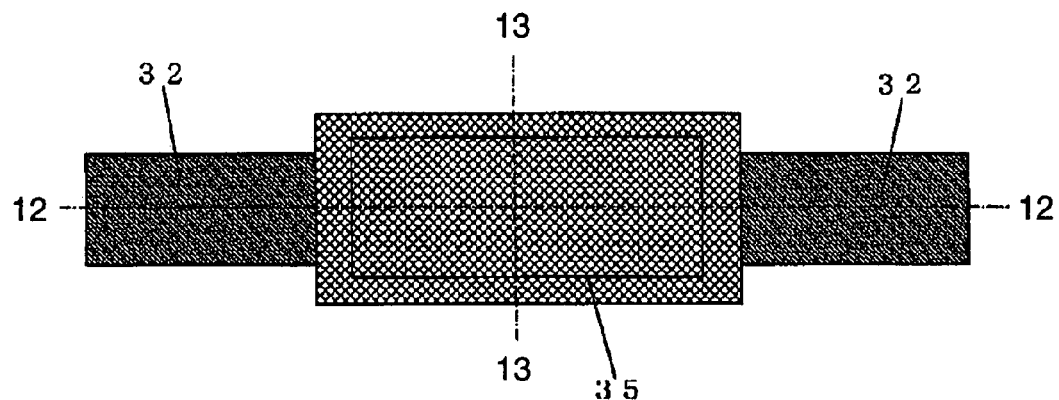
FIG. 11 is a top view of a thin thermal fuse according to exemplary Embodiment 6 of the invention.
Figure 12:
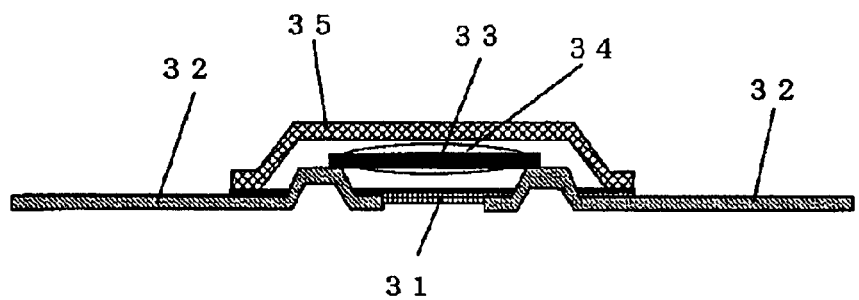
FIG. 12 is a sectional view of the fuse at line 12-12 in FIG. 11.
Figure 13:
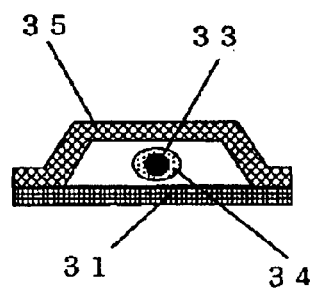
FIG. 13 is a sectional view of the fuse at line 13-13 in FIG. 11.
Figure 14:
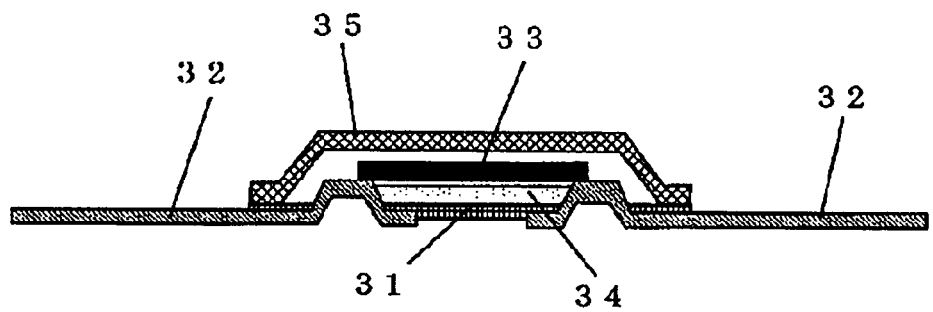
FIG. 14 is a sectional view of the thermal fuse having melting flux according to Embodiment 6.

FIG. 11 is a top view of a thin thermal fuse according to Exemplary Embodiment 6 of the present invention. FIG. 12 is a sectional view of the fuse at line 12-12 in FIG. 11. FIG. 13 is a sectional view of the fuse at line 13-13 in FIG. 11. FIG. 14 is a sectional view of the thermal fuse having melting flux. A pair of metal terminals 32 are mounted to a first insulating film 31 having a plate shape and made of resin, such as polyethylene telephthalate or polyethylene naphthalate. A portion of each of the metal terminals 32 is exposed from a bottom of the film to the top of the film. The metal terminal 32 has a strop shape or a wire shape, and are formed by plating surfaces of conductive metal, such as copper or nickel, with solder, tin, copper or the like. Fusible alloy 33 is connected to portions of the metal terminals 32 above the first insulating film 31. The fusible alloy 33 is made of one of tin, lead, zinc, bismuth, indium, cadmium, silver, copper, and alloy of these metals. Flux 34 is coated on the fusible alloy 33, and is made of resin essentially including rosin, and the number of colors of the flux 34 ranges from 4 to 16. A second insulating film 35 having a sheet shape is mounted on the first insulating film 31 by sealing. The second insulating film 35 is positioned above the fusible alloy 33, so that a space is provided between the film 35 and the first insulating film 31. The second insulating film 35 is preferably made of the same material as that of the first insulating film 31. Thus, the fusible alloy 33 is covered with the first insulating film 31 and the second insulating film 35. The first insulating film 31 and the second insulating film 35 are fixed by sealing positions excluding an area where the fusible alloy 33 is located. The fusible alloy 33 is enclosed as above, thus being prevented from deteriorating.

According to Embodiment 6, as shown in FIG. 12, the volume of a space under the fusible alloy 33 and over the top surface of the first insulating film 31 is larger than the volume of the flux 34.

Upon being used on an electronic device or a heating component, such as a transformer or a motor, as shown in FIG. 14, the thermal fuse of Embodiment 6 is attached to the electronic device or the heating component, so that the space under the fusible alloy 33 and over the top surface of the first insulating film 31 is positioned substantially in the same direction as the gravity from the fusible alloy 33. According to Embodiment 6, the volume of the space under the fusible alloy 33 and over the top surface of the first insulating film 31 is larger than the volume of the flux 34. Therefore, when the flux 34 melts according to an increase of an ambient temperature, most of the flux 34 melts and reliably moves into the space under the fusible alloy 33 and over the top surface of the first insulating film 31 due to the gravity. As a result, little amount of the flux 34 existing on the fusible alloy 33. Even when arc is generated between tips of the fusible alloy 33 melting according to a further increase of the ambient temperature to exceed the melting point of fusible alloy 33, vaporization of the flux 34 caused by the arc is reduced. Accordingly, in the thermal fuse of Embodiment 6, since a pressure rise in the space in the thermal fuse can be suppressed, sealing is prevented from deteriorating and damage even when the fuse is used for breaking a large current at a high voltage.

Exemplary Embodiment 7

Figure 15:
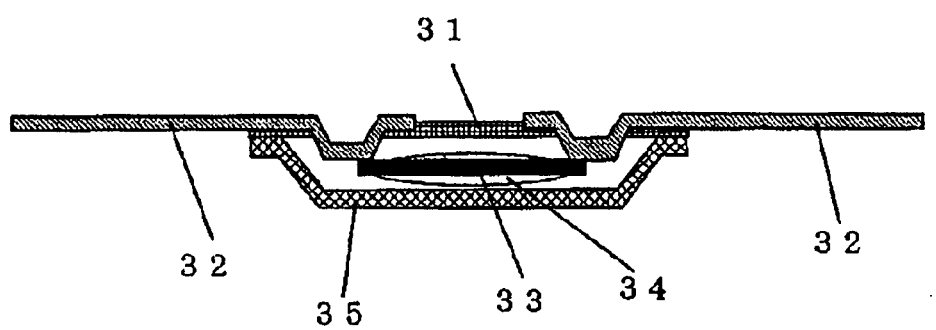
FIG. 15 is a sectional view of a thin thermal fuse according to exemplary Embodiment 7 of the invention.
Figure 16:
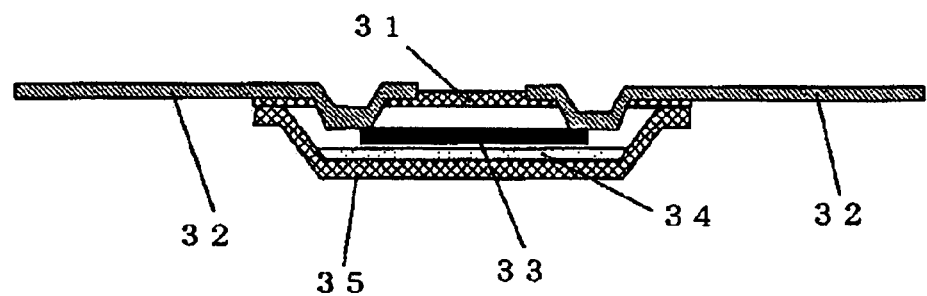
FIG. 16 is a sectional view of the thermal fuse having melting flux according to Embodiment 7.

FIG. 15 is a sectional view of a thin thermal fuse according to Exemplary Embodiment 7 of the present invention. FIG. 16 is a sectional view of the thermal fuse having melting flux. The thermal fuse of Embodiment 7 includes the same components as those of a thin thermal fuse of Embodiment 6 shown in FIGS. 11 to 14. The fuse of Embodiment 7, differently from that of Embodiment 6, as shown in FIG. 15, the volume of a space over the top side of fusible alloy 33 and under the second insulating film 35 is larger than the volume of flux 34.

Upon being used on an electronic device or a heating component, such as a transformer or a motor, as shown in FIG. 16, the thermal fuse of Embodiment 7 is attached to the electronic device or the heating component, so that the space over the top side of fusible alloy 33 and under the second insulating film 35 is positioned substantially in the same direction as the gravity from the fusible alloy 33. According to Embodiment 7, the space volume over the top side of fusible alloy 33 and under the second insulating film 35 is larger than the volume of the flux 34. Therefore, when the flux 34 melts according to an increase of an ambient temperature, most of the flux 34 melts and then reliably moves into the space over the top side of the fusible alloy 33 and under the second insulating film 35 due to the gravity. As a result, little amount of the flux 34 existing on the fusible alloy 33. Even when arc is generated between tips of fusible alloy 33 melting according to a further increase of the ambient temperature to exceed the melting point of fusible alloy 33, vaporization of the flux 34 caused by the arc is reduced. Accordingly, in the thermal fuse of Embodiment 7, since a pressure rise in the space in the thermal fuse can be suppressed, sealing is prevented from deteriorating or damage even when the fuse is used for breaking a large current at a high voltage.

Exemplary Embodiment 8

Figure 17:
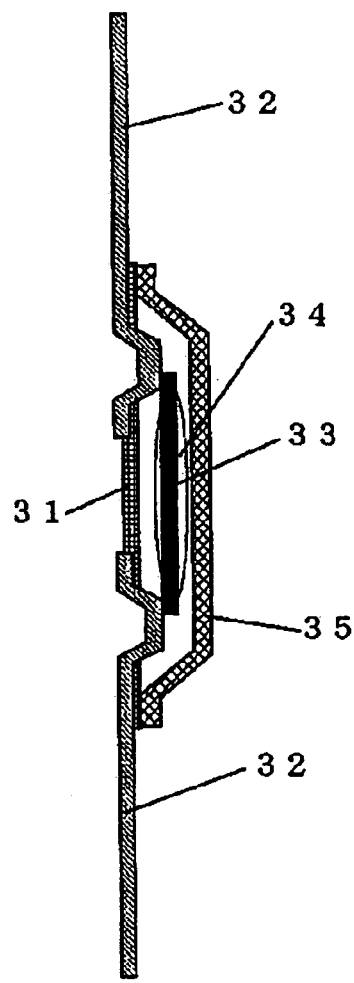
FIG. 17 is a sectional view of a thin thermal fuse according to Exemplary Embodiment 8 of the invention.
Figure 18:
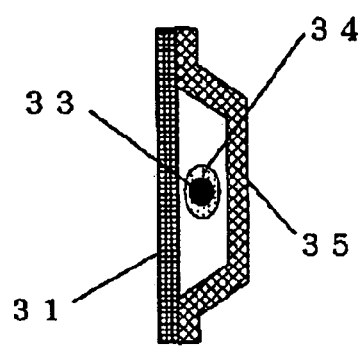
FIG. 18 is a sectional view of the thermal fuse according to Embodiment 8.
Figure 19:
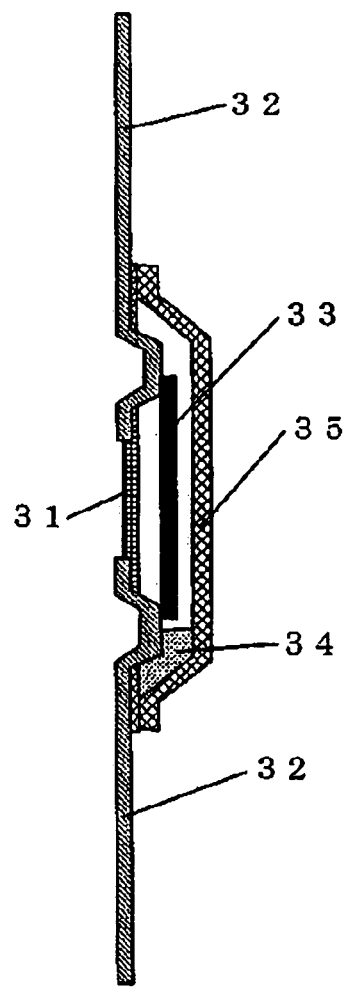
FIG. 19 is a sectional view of the thermal fuse having melting flux according to Embodiment 8.
Figure 20:
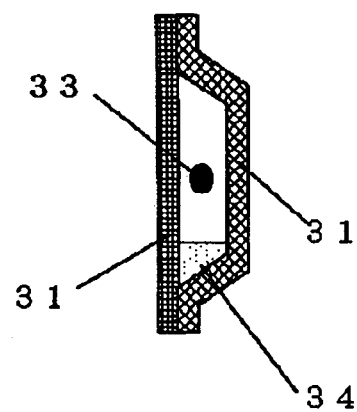
FIG. 20 is a sectional view of the thermal fuse having melting flux according to Embodiment 8.

FIGS. 17 and 18 are sectional views of a thin thermal fuse according to Exemplary Embodiment 8 of the present invention. FIGS. 19 and 20 are sectional views of the thermal fuse having melting flux. The thermal fuse of Embodiment 8 includes the same components as those of a thin thermal fuse of Embodiment 6 shown in FIGS. 11 to 14. The fuse of Embodiment 8, differently from that of Embodiment 6, as shown in FIGS. 17 and 18, the volume of a space between one side of the fusible alloy 33 and a sealing portion of a first insulating film 31 and a second insulating film 35 is larger than the volume of flux 34.

Upon being used on an electronic device or a heating component, such as a transformer or a motor, as shown in FIGS. 19 and 20, the thermal fuse of Embodiment 8 is attached to the electronic device or a heating component, so that the space between one side of the fusible alloy 33 and the sealing portion of the first insulating film 31 and the second insulating film 35 is positioned substantially in the same direction as the gravity from the fusible alloy 33. According to Embodiment 8, the volume of the space between one side of the fusible alloy 33 and the sealing portion of the first insulating film 31 and the second insulating film 35 is larger than the volume of the flux 34. Therefore, when the flux 34 in use melts according to an increase of an ambient temperature, most of the flux 34 melts and then reliably moves into the space between one side of the fusible alloy 33 and the sealing portion of the first insulating film 31 and the second insulating film 35 due to the gravity. As a result, little amount of the flux 34 existing on the fusible alloy 33. Even when arc is generated between tips of the fusible alloy 33 melting according to a further increase of the ambient temperature to exceed the melting point of fusible alloy 33, vaporization of the flux 34 caused by the arc is reduced. Accordingly, in the thermal fuse of Embodiment 8, since a pressure rise in the space in the thermal fuse can be suppressed, sealing is prevented from deteriorating and damage even when the fuse is used for breaking a large current at a high voltage.

Exemplary Embodiment 9

Figure 21:
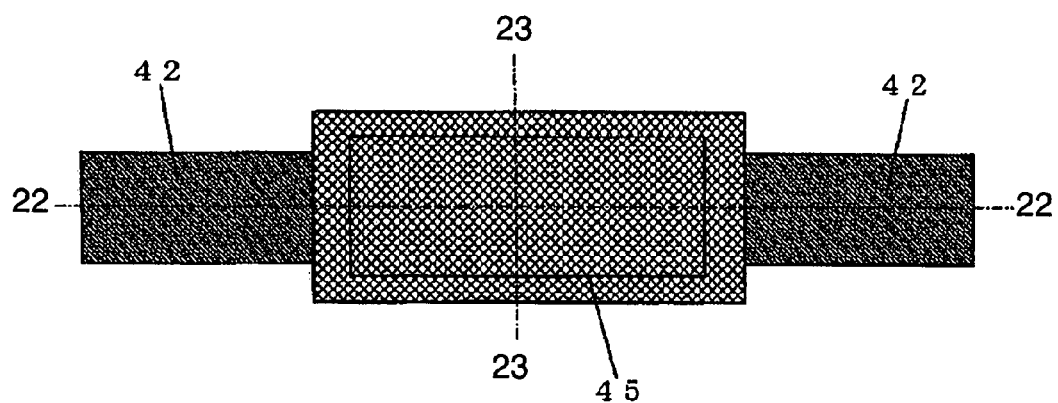
FIG. 21 is a top view of a thin thermal fuse according to Exemplary Embodiment 9 of the invention.
Figure 22:
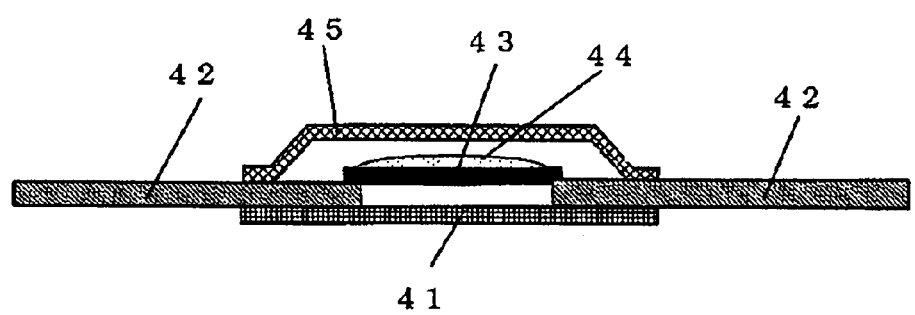
FIG. 22 is a sectional view of the fuse at line 22-22 in FIG. 21.
Figure 23:
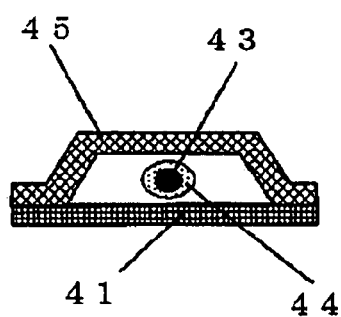
FIG. 23 is a sectional view of the fuse at line 23-23 in FIG. 21.
Figure 24:
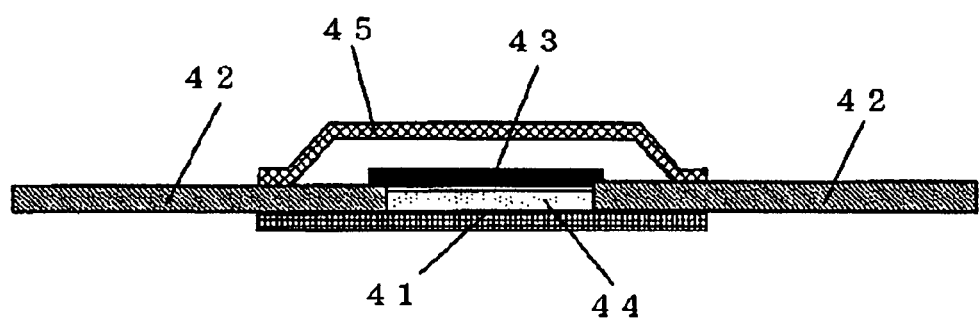
FIG. 24 is a sectional view of the thermal fuse having melting flux according to Embodiment 9.

FIG. 21 is a top view of a thin thermal fuse according to Exemplary Embodiment 9 of the present invention. FIG. 22 is a sectional view of the fuse at line 22-22 in FIG. 21. FIG. 23 is a sectional view of the fuse at line 23-23 in FIG. 11. FIG. 24 is a sectional view of the thermal fuse having melting flux. A pair of metal terminals 42 having a width smaller than a width of first insulating film 41 are mounted to the first insulating film 41 having a plate shape and made of resin, such as polyethylene telephthalate and polyethylene naphthalate. The metal terminals 42 have a strip shape or a wire shape, and are formed by plating surfaces of a conductive metal, such as copper and nickel, with solder, tin, copper or the like. Fusible alloy 43 is connected to respective end portions of the metal terminals 42 and is positioned above the first insulating film 41. The fusible alloy 43 is made of one of tin, lead, zinc, bismuth, indium, cadmium, silver, copper, or alloy of these metals. Flux 44 is provided on the fusible alloy 43, and is made of resin essentially including rosin. The number of colors of the flux 44 ranges from 4 to 16. A second insulating film 45 having a sheet shape is mounted on the first insulating film 41 by sealing. The second insulating film 45 is positioned above the fusible alloy 43 to provide a space between the film 45 and the first insulating film 41. The second insulating film 45 is preferably made of the same material as that of the fist insulating film 41. Thus, the fusible alloy 43 is covered with the first insulating film 41 and the second insulating film 45. The outer periphery of the first insulating film 41 and the outer periphery of the second insulating film 45 are fixed by sealing at positions excluding an area where the fusible alloy 43 is not located. The fusible alloy 43 is enclosed as above, thus being prevented from deteriorating.

According to Embodiment 9, as shown in FIG. 22, the volume of a space under the fusible alloy 43 and over the top surface of the first insulating film 41 is larger than the volume of the flux 44.

When is used on an electronic device or a heating component, such as a transformer or a motor, as shown in FIG. 24, the thermal fuse of Embodiment 9 is attached to the electronic device or the heating component, so that the space under the fusible alloy 43 and over the top surface of the first insulating film 41 is positioned substantially in the same direction as the gravity from the fusible alloy 43. According to Embodiment 9, the volume of the space under the fusible alloy 43 and over the top surface of the first insulating film 41 is larger than the volume of the flux 44. Therefore, when the flux 44 melts according to an increase of an ambient temperature, most of the flux 44 melts and then reliably moves into the space under the fusible alloy 43 and over the top surface of the first insulating film 41 due to the gravity. As a result, little amount of the flux 44 existing on the fusible alloy 43. Even when arc is generated between tips of the fusible alloy 43 melting according to a further increase of the ambient temperature to exceed the melting point of fusible alloy 43, vaporization of the flux 44 caused by the arc is reduced. Accordingly, in the thermal fuse of Embodiment 9, since a pressure rise in the space in the thermal fuse can be suppressed, the sealing is prevented from deteriorating or damage even when the fuse is used for breaking a large current at a high voltage.

Exemplary Embodiment 10

Figure 25:
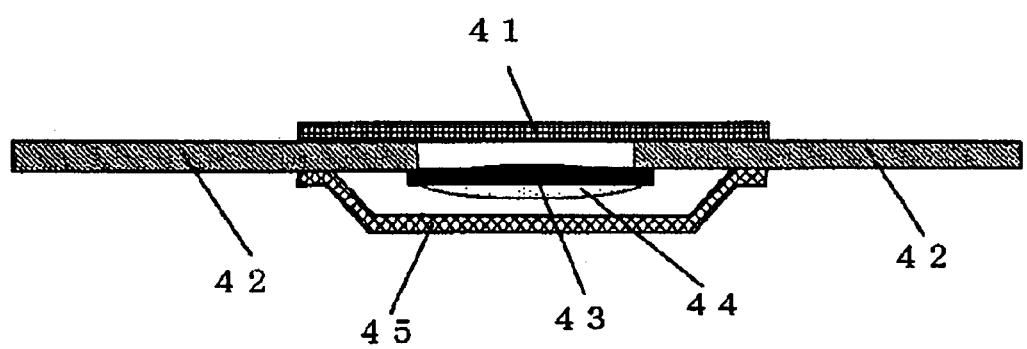
FIG. 25 is a sectional view of a thin thermal fuse according to Exemplary Embodiment 10 of the invention.
Figure 26:
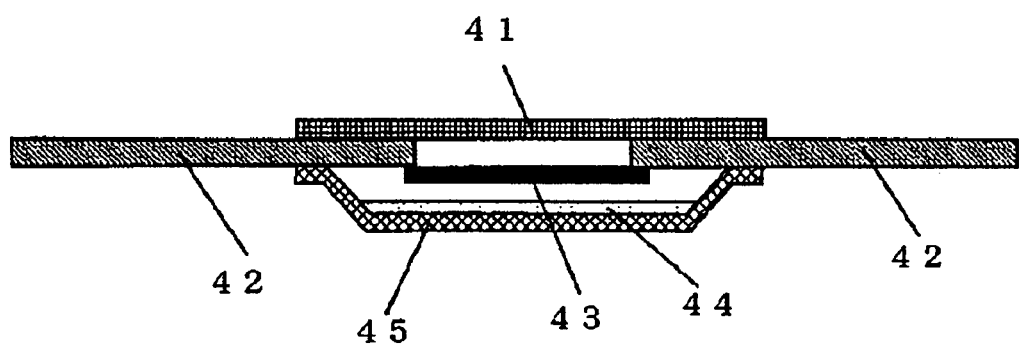
FIG. 26 is a sectional view of the thermal fuse having melting flux according to Embodiment 10.

FIG. 25 is a sectional view of a thin thermal fuse according to Exemplary Embodiment 10 of the present invention. FIG. 26 is a sectional view of the thermal fuse having melting flux. The thermal fuse of Embodiment 10 includes the same components as those of a thin thermal fuse of Embodiment 9 shown in FIGS. 21 to 24. The fuse of Embodiment 10, differently from that of Embodiment 9, as shown in FIG. 25, the volume of a space over a top side of fusible alloy 43 and under a second insulating film 45 is larger than the volume of flux 44.

Upon being used on an electronic device or a heating component, such as a transformer or a motor, as shown in FIG. 26, the thermal fuse of Embodiment 10 is attached to the electronic device or the heating component, so that the space over the top side of fusible alloy 43 and under the second insulating film 45 is positioned substantially in the same direction as the gravity from the fusible alloy 43. According to Embodiment 10, the volume of the space over the top side of fusible alloy 43 and under the second insulating film 45 is larger than the volume of the flux 44. Therefore, when the flux 44 in use melts according to an increase of an ambient temperature, most of the flux 44 melts and then reliably moves into the space over the top side of fusible alloy 43 and under the second insulating film 45 due to the gravity. As a result, little amount of the flux 44 existing on the fusible alloy 43. Even when arc is generated between tips of the fusible alloy 43 melting according to a further increase of the ambient temperature to exceed the melting point of fusible alloy 43, vaporization of the flux 44 caused by the arc is reduced. Accordingly, in the the thermal fuse of Embodiment 10, since a pressure rise in the space in the thermal fuse can be suppressed, the sealing is prevented from deteriorating or damage even when the fuse is used for breaking a large current at a high voltage.

Exemplary Embodiment 11

Figure 27:
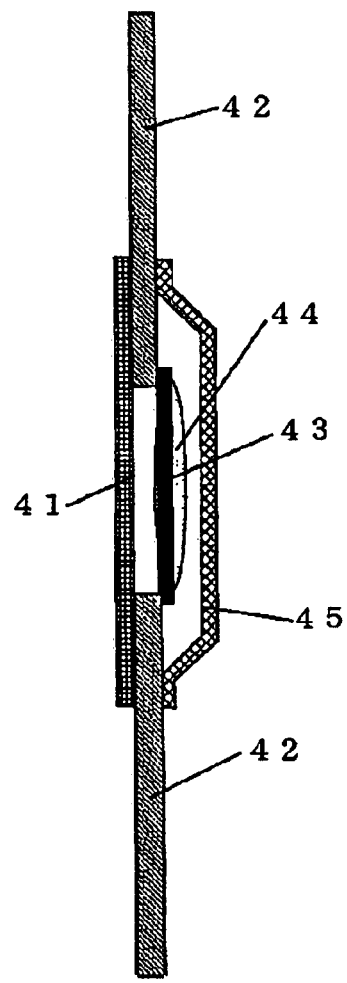
FIG. 27 is a sectional view of a thin thermal fuse according to Exemplary Embodiment 11 of the invention.
Figure 28:
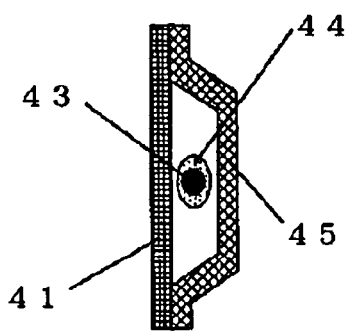
FIG. 28 is a sectional view of the thermal fuse according to Embodiment 11.
Figure 29:
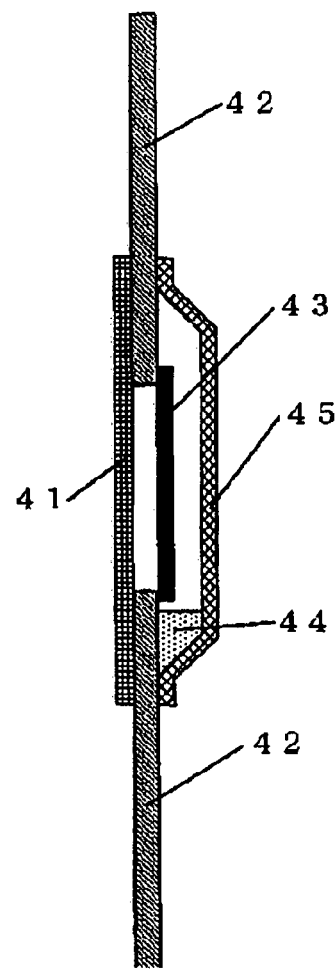
FIG. 29 is a sectional view of the thermal fuse having melting flux according to Embodiment 11.
Figure 30:
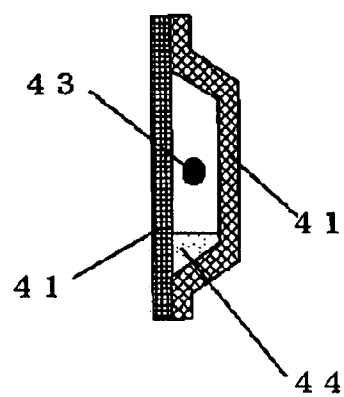
FIG. 30 is a sectional view of the thermal fuse having melting flux according to Embodiment 11.

FIGS. 27 and 28 are sectional views of a thin thermal fuse according to Exemplary Embodiment 11 of the present invention. FIGS. 29 and 30 are sectional views of the thermal fuse having melting flux. The thermal fuse of Embodiment 11 includes the same components as those of a thin thermal fuse of Embodiment 9 shown in FIGS. 21 to 24. The fuse of Embodiment 11, differently from that of Embodiment 9, as shown in FIGS. 27 and 28, the volume of a space between one side of the fusible alloy 43 and a sealing portion of a first insulating film 41 and a second insulating film 45 is larger than the volume of flux 44.

Upon being used on an electronic device or a heating component, such as a transformer or a motor, as shown in FIGS. 29 and 30, the thermal fuse of Embodiment 11 is attached to the electronic device or the heating component, so that the space between one side of the fusible alloy 43 and the sealing portion of the first insulating film 41 and the second insulating film 45 is positioned substantially in the same direction as the gravity from the fusible alloy 43. According to Embodiment 11, the volume of the space between one side of the fusible alloy 43 and the sealing portion of the first insulating film 41 and the second insulating film 45 is larger than the volume of the flux 44. Therefore, when the flux 44 melts according to an increase of an ambient temperature, most of the flux 44 melts and then reliably moves into the space between one side of the fusible alloy 43 and the sealing portion of the first insulating film 41 and the second insulating film 45 due to the gravity. As a result, little amount of the flux 44 existing on the fusible alloy 43. Even when arc is generated between tips of fusible alloy 43 melting according to a further increase of the ambient temperature to exceed the melting point of fusible alloy 43, vaporization of the flux 44 caused by the arc is reduced. Accordingly, in the thermal fuse of Embodiment 11, since a pressure rise in the space in the thermal fuse can be suppressed, the sealing is prevented from deteriorating or damage even when the fuse is used for breaking a large current at a high voltage.

Exemplary Embodiment 12

A thermal fuse according to Exemplary Embodiment 12 of the present invention includes a thermal fuse body composed of first and second insulating films for accommodating a fusible alloy of thermal fuses of Embodiments 6 to 11. The thermal fuse body has longitudinal length L1, width L2, and thickness L3 satisfying the following conditions:

2.0 mm$\leq$L1$\leq$5.0 mm;

1.5 mm$\leq$L2$\leq$3.5 mm; and 0.4 mm$\leq$L3$\leq$1.5 mm.

The conditions allows the thermal fuse to be thin and small. Further Sealing of the fuse is prevented from deteriorating or damage even when the fuse is used for breaking a large current at a high voltage.

Exemplary Embodiment 13

Figure 31:
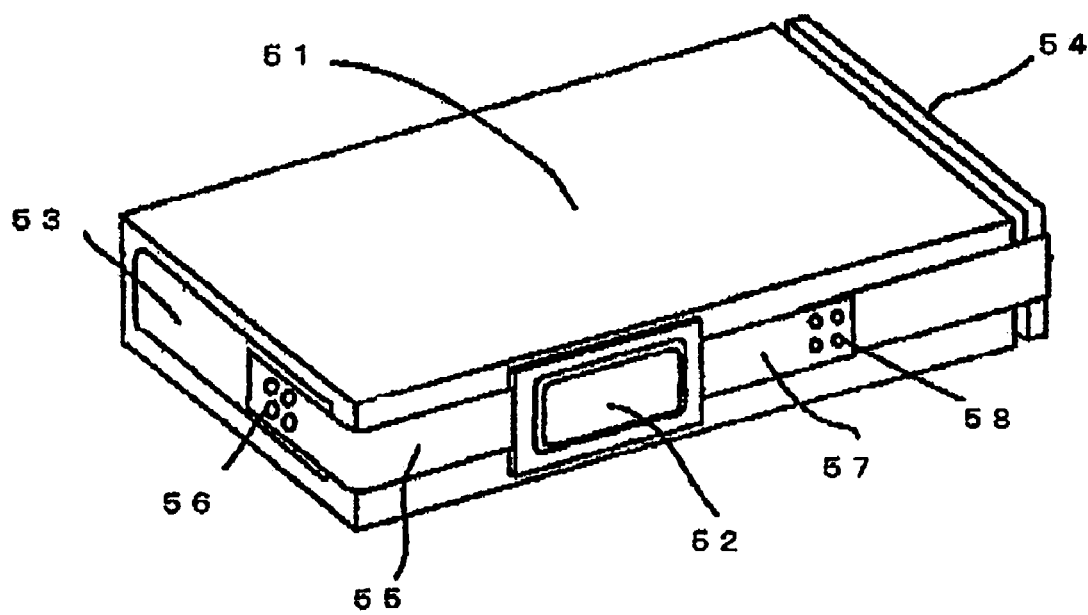
FIG. 31 is a perspective view of a battery according to exemplary Embodiment 13 of the invention.
Figure 32:
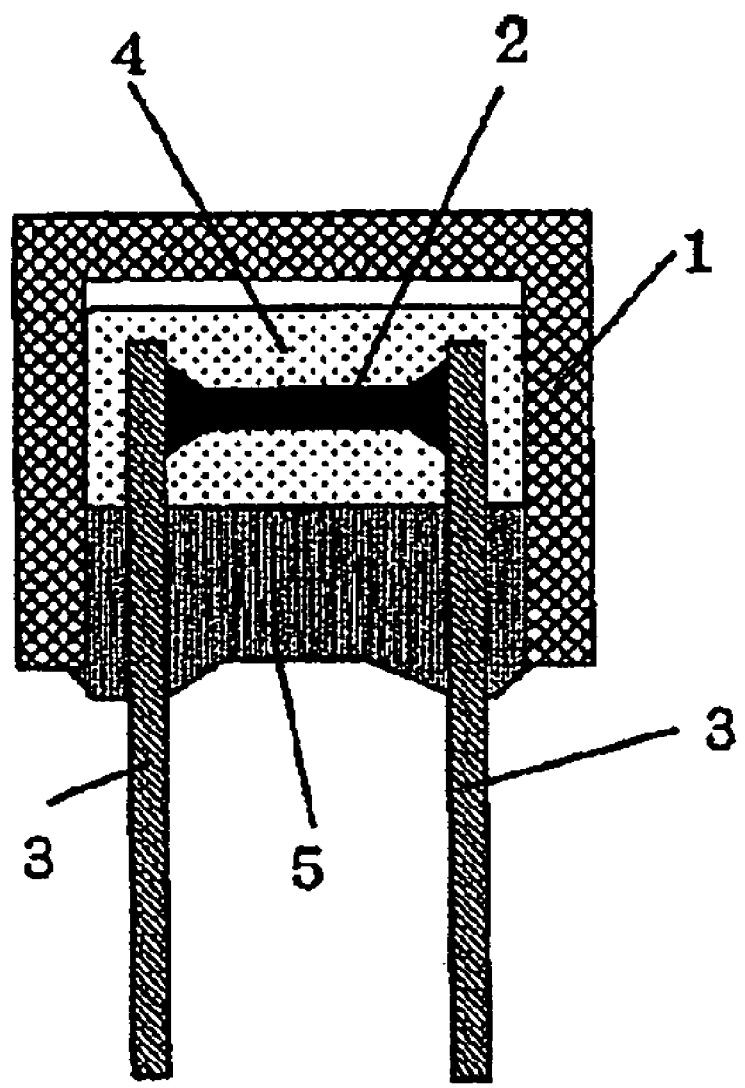
FIG. 32 is a sectional view of a conventional thermal fuse.

FIG. 31 is a perspective view of a battery according to Exemplary Embodiment 13 of the present invention. The battery includes a battery body 51, a thermal fuse 52 electrically connected to the battery body 51, an external electrode 53 provided on a side of the battery body 51, and a protective circuit 54 electrically connected to the battery body 51. The thermal fuse 52 breaks a current at abnormal heating of the battery body 51. The thermal fuse 52 is one of thermal fuses of Embodiments 6 to 12. A terminal 55 of the thermal fuse 52 is electrically connected to the external electrode 53 of the battery body 51 by spot-welding or the like at a connection portion 56. A terminal 57 of the fuse 52 is electrically connected to the protective circuit 54 by spot-welding or the like at a connection portion 58. The thermal fuse 52 breaks the current when heat produced by the battery body 51 becomes larger than a predetermined level, or when abnormal heat is generated.

In the battery of Embodiment 13, when a flux in the thermal fuse 52 melts according to an increase of an ambient temperature during the use of the battery, the flux melts and then reliably moves into an inner space of the thermal fuse 52. Therefore, little amount of the flux existing on the fusible alloy. Accordingly, even when arc is generated between tips of the fusible alloy melting according to a further increase of the ambient temperature to exceed the melting point of the fusible alloy, vaporization of the flux caused by the arc is reduced. As a result, a pressure rise in the space in the thermal fuse can be suppressed. Sealing of the thermal fuse 52 in the battery is prevented from deteriorating and damage even when the fuse is used for breaking a large current at a high voltage.

INDUSTRIAL APPLICABILITY

A thermal fuse according to the present invention includes an insulating case having a bottom and having an opening provided therein, a fusible alloy provided in the insulating case, a lead conductor having one end connected to the fusible alloy and other end led out from the insulating case through the opening of the insulating case, a flux provided on the fusible alloy, and a sealer for sealing the opening of the insulating case. The volume of a space in the insulating case between the fusible alloy and the sealer is larger than the volume of the flux.

This configuration allows most of the flux to move into the space in the insulating case between the fusible alloy and the sealer when the flux melts according to an increase of an ambient temperature. As a result, little amount of the flux existing on the fusible alloy. Even when arc is generated between tips of the fusible alloy melting according to a further increase of the ambient temperature to exceed the melting point of the fusible alloy, vaporization of the flux caused by the arc is reduced. Accordingly, since a pressure rise of the space in the thermal fuse can be suppressed, sealing of the fuse is prevented from deteriorating, and the insulating case is prevented from damage even when the fuse is used for breaking a large current at a high voltage.

The invention claimed is:

1. A thermal fuse comprising:
a first insulating film;
metal terminals mounted to said first insulating film and having respective portions projecting in a first direction from said first insulating film;
a fusible alloy positioned in said first direction from said first insulating film and connected between said respective portions of said metal terminals;
a flux provided on said fusible alloy; and
a second insulating film positioned in said first direction from said fusible alloy and fitted to said first insulating film at a sealing portion, said second insulating film providing a space between said first and insulating films,
wherein a volume of a space between one end of said fusible alloy and said sealing portion for sealing said first and second insulating films is larger than a volume of said flux.

2. The thermal fuse of claim 1, wherein said thermal fuse is mounted to a heating device so that said space formed between said one end of said fusible alloy and said sealing portion for sealing said first and second insulating films is positioned substantially in the same direction as gravity from said fusible alloy.

3. The thermal fuse of claim 1, further comprising a thermal fuse body including said first and second insulating films for accommodating said fusible alloy, said thermal fuse body having a longitudinal length L1, a width L2, and a thickness L3 satisfying:
   2.0 mm$\leq$L1$\leq$5.0 mm;
   1.5 mm$\leq$L2$\leq$3.5 mm; and
   0.4 mm$\leq$L3$\leq$1.5 mm.

4. The thermal fuse of claim 1, wherein said flux includes not less than 20 wt. % of amide stearate.

5. A battery, comprising:
a battery body, and
a thermal fuse including
   a first insulating film,
   metal terminals mounted to said first insulating film and having respective portions projecting in a first direction from said first insulating film,
   a fusible alloy positioned in said first direction from said first insulating film and connected between said respective portions of said metal terminals, said fusible alloy being arranged to melted due to heat from said battery body,
   a flux provided on said fusible alloy, and
   a second insulating film positioned in said first direction from said fusible alloy and fitted to said first insulating film at a sealing portion, said second insulating film providing a space between said first and second insulating films,
   wherein a volume of a space between one end of said fusible alloy and said sealing portion for sealing said first and second insulating films is larger than a volume of said flux.

6. The battery of claim 5, wherein said space formed between said one end of said fusible alloy and said sealing portion for sealing said first and second insulating films is positioned substantially in the same direction as gravity from said fusible alloy.

7. The battery of claim 5, wherein said flux includes not less than 20 wt. % of amide stearate.

* * * * *